(12) United States Patent
Watanabe et al.

(10) Patent No.: US 6,259,503 B1
(45) Date of Patent: Jul. 10, 2001

(54) ACTIVE MATRIX LIQUID CRYSTAL DISPLAY DEVICE HAVING A WIDE VIEWING ANGLE WITHOUT COLOR SHIFT

(75) Inventors: Makoto Watanabe; Osamu Sukegawa, both of Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/222,305

(22) Filed: Dec. 28, 1998

(30) Foreign Application Priority Data

Dec. 26, 1997 (JP) .................................................. 9-360719

(51) Int. Cl.[7] ........................ G02F 1/1343; G02F 1/1337
(52) U.S. Cl. ........................... 349/141; 349/139; 349/129
(58) Field of Search .................................. 349/138, 141, 349/139, 129, 78, 85

(56) References Cited

U.S. PATENT DOCUMENTS

| | | | |
|---|---|---|---|
| 5,905,556 | * 5/1999 | Suzuki et al. | 349/141 |
| 5,995,182 | * 11/1999 | Watanabe et al. | 349/110 |
| 6,038,007 | * 3/2000 | Watanabe et al. | 349/110 |
| 6,078,375 | * 6/2000 | Matsumoto et al. | 349/123 |
| 6,111,626 | * 8/2000 | Watanabe et al. | 349/141 |

FOREIGN PATENT DOCUMENTS 7-191336    7/1995   (JP) .

* cited by examiner

*Primary Examiner*—William L. Sikes
*Assistant Examiner*—Tarifur R. Chowdhury
(74) *Attorney, Agent, or Firm*—Sughrue, Mion, Zinn, Macpeak & Seas, PLLC

(57) ABSTRACT

An active matrix LCD device has a plurality of pixel elements arranged in a matrix for display. The electric field generated between the pixel electrode and the common electrode is diagonal to the normal of the surface of the electrodes. The diagonal electric field is achieved by a slit formed in the TFT panel between the pixel electrodes and the common electrode, or by protrusions formed on the surfaces of the electrodes.

5 Claims, 21 Drawing Sheets

RUBBING DIRECTION (a) BLACK  (b) INTERMEDIATE  (c) WHITE $N = \varepsilon_0 \Delta \varepsilon E^2 \sin\Phi\cos\Phi$

302

ACTIVE MATRIX LIQUID CRYSTAL DISPLAY DEVICE HAVING A WIDE VIEWING ANGLE WITHOUT COLOR SHIFT

BACKGROUND OF THE INVENTION (a) Field of the Invention

The present invention relates to an active matrix liquid crystal display (LCD) device having a wide viewing angle.

(b) Description of the Related Art

Conventional LCD devices include a static drive LCD device wherein an electric field is applied to the liquid crystal (LC) by a constant voltage signal. The static drive LCD device has a drawback in that a large number of signal lines are required in the case of a large capacity display panel.

Thus, a large capacity LCD panel generally uses a multiplex drive scheme, wherein the signal voltages are supplied to the LC in a time sharing scheme. Among the LCD devices using the multiplex drive scheme, an active matrix LCD device, wherein electric charge supplied to the electrodes in a frame period is maintained to a next frame period, exhibits a high image quality. On the other hand, LCD devices are categorized also into two types including one wherein the electric field is applied to the LC perpendicular to the glass substrates sandwiching therebetween the LC, and the other wherein the electric field is applied parallel to the substrate. The latter is called "In-plane Switching Scheme" and especially suited to a large size monitor due to its wide viewing angle.

FIG. 1 shows the structure of electrodes in a pixel element of a conventional active matrix LCD device, such as described in JP-B-63-21907. The LCD device includes a plurality of pixel elements arranged in a matrix, a plurality of scanning lines 108 each connected to an external drive circuit and gates of a corresponding row of the pixel elements, a plurality of signal lines 102 each for supplying a corresponding column of the pixel elements, a common electrode 103 disposed for all of the pixel elements and having a comb-shape electrode portion in each pixel area. Each pixel element includes a thin film transistor (TFT) 109 and a pixel electrode 104 having a comb shape corresponding to the comb shape of the electrode portion of the common electrode.

Referring to FIG. 2 taken along line II—II in FIG. 1, the conventional LCD device has a LC panel 300 including a TFT panel 100 and a counter panel 200. The TFT panel 100 includes, from the front side thereof, a TFT glass substrate 101 having a first polarizing plate 110 on the front side thereof, the common electrode 103, an insulator film 105, and the pixel electrode 104 and the signal line 102. The teeth of the comb-shape pixel electrode 104 and teeth of the comb-shape common electrode 103 are arranged alternatively with each other to oppose each other in the direction parallel to the LC panel 300. These electrodes 103 and 104 are protected by a protective insulator film 106, on which a first orientation film 107 is formed by coating. The first orientation film 107 is subjected to a rubbing operation in a first direction.

The counter panel 200 has, from the rear side thereof, a glass counter substrate 201 having a second polarizing plane 205 on the rear side thereof, a matrix shield film 203 for shielding light, a color film 204 for displaying multi-color image, a planarization film 202, and a second orientation film 207. The second orientation film 207 is subjected to rubbing operation in the second direction opposite to the first direction.

LC layer 301 is disposed between the TFT panel 100 and the counter panel 200, wherein the LC molecules are oriented in the first direction adjacent to the TFT panel 100 by the first orientation film 107 and in the second direction adjacent to the counter panel 200 by the second orientation film 207. The first polarizing plate 110 bonded onto the front side of the TFT substrate 101 has a light transmission axis perpendicular to the first direction, whereas the second polarizing plate 205 bonded onto the rear side of the counter substrate 201 has a light transmission axis perpendicular to the light transmission axis of the first polarizing plate 110.

In operation, the TFT 109 is turned on/off by the corresponding scanning line 108 formed as the common layer with the pixel electrode 103. When the TFT 109 is turned on, electric charge flows from the signal line 102 into the pixel electrode 104, and after the TFT 109 is turned off in the subsequent period, the pixel electrode 104 stores the electric charge. The common electrode 103 is maintained at a constant potential, thereby generating a transverse electric filed due to the potential difference between the same and the pixel electrode 104 in the direction parallel to the LC panel 300.

The transverse electric field rotates the crystal axis of the LC molecules due to the interaction between the electric field and the dielectric anisotropy of the LC molecules, as shown in FIG. 3, wherein the rotation is exemplarily shown in the case of a positive dielectric anisotropy of the LC molecules. If the dielectric anisotropy is negative, the rotation is opposite to the direction shown in FIG. 3. The rotation of the LC molecules generates retardation change, wherein the transmission (or permeability) changes at the locations where the light shield layer 203, pixel electrode 104, common electrode 103, scanning line 108 and TFT 109 are not disposed.

FIG. 4 shows the principle of the operation of the LCD panel, wherein the LC molecule exemplarily has a positive dielectric anisotropy. The direction of the initial orientation of the LC molecules 302 is determined depending on the rubbing direction of the first orientation film 107 on the TFT panel 100, and thus aligned perpendicular to the polarizing axis of the first polarizing plate 110 of the TFT panel 100. The incident light is polarized by the first polarizing plate 110, and thus is substantially completely shielded by the second polarizing plate 205 because the polarized light is not subjected to the retardation of the liquid crystal layer 301. In this state, the LCD panel exhibits black.

When the transverse electric field is applied to the LC molecule due to the potential difference between the common electrode 103 and the pixel electrode 104, the LC molecule 302 rotates due to the interaction between the dielectric anisotropy of the LC molecule and the transverse electric field. The incident light is subjected to the retardation of the LC due to the dielectric anisotropy, and generally assumes an elliptical polarization just before passing the second polarizing plate 205. The component of the elliptically polarized light aligned with the polarization axis passes the LCD panel 300, and the time average of the light intensity is sensed by human eyes.

The shape of the elliptically polarized light is changed depending on the angle $\psi$ defined by the mean orientation and the initial orientation of the LC molecules 302, wherein the normalized transmission $T/T_0$ is determined by the following approximate expression:

$$T/T_0 = \sin^2(2\psi)\sin^2(\Delta n \times d \times \pi/\lambda) \quad (1)$$

wherein $\Delta n$, $d$ and $\lambda$ are anisotropy in the refractive index, cell gap and wavelength of the transmitted light, respectively. In equation (1), the minimum transmission is obtained by ψ=0°, whereas the maximum transmission is obtained by ψ=45°.

In the active matrix LCD device as described above, a color tint phenomenon is generally observed due to the refractive index anisotropy of the LC modules, wherein the polarized light exhibits a blue or yellow tint when the LC panel is observed with a relatively large viewing angle. As schematically illustrated in FIG. 5, the view angle along the major axes of the LC molecules involves the blue tint, whereas the view angle along the minor axes of the LC molecules involves the yellow tint. FIG. 6 shows x-y chromaticity change in the case of an intermediate gray scale level, wherein LCD device is observed with a viewing angle θ=60°, with the azimuth φ being between 0 and 360°. The definition for the viewing angle θ and the azimuth φ are shown in FIG. 7, wherein the gothic arrow indicates the chromaticity coordinates as viewed from the front. Referring to FIG. 6 showing x-y coordinate chromaticity change, it will be noted that the viewing direction which is diagonal to the front view involves a large color shift toward blue or yellow.

The mechanism of generation of the tint phenomenon is detailed below. Table 1 shows theoretical formulae of the effective refractive index anisotropy Δn' and the effective thickness d' of the liquid crystal cell when the LC molecules 302 are observed from the direction along the major axes and the minor axes thereof, with a viewing angle of θ.

TABLE 1

|  | Δn' | d' |
| --- | --- | --- |
| major axis | $\dfrac{n_e n_o}{\sqrt{n_e^2\sin^2\theta + n_o^2\cos^2\theta}} - n_0$ | $\dfrac{d}{\cos\theta}$ |
| minor axis | Δn | $\dfrac{d}{\cos\theta}$ |

Typical values substituted for respective parameters in the formulae shown in Table 1 provide viewing angle dependency of retardation (Δn'×d'), as shown in FIG. 8. Specifically, the relationship between the retardation $\Delta n_0 \times d_0$ and the wavelength λ of the maximum-transmitted light is expressed by:

$$\Delta n \times d / \lambda = \tfrac{1}{2} \qquad (2)$$

That is, the retardation and the wavelength of the maximum-transmitted light are proportional to each other. From FIG. 8 and equation (2), the blue tint and the yellow tint are observed when the viewing direction is aligned with the major axes and the minor axes, respectively, of the LC molecules.

Referring to FIG. 9, there are shown diagrams of orientations of the LC molecules as viewed in the cell thickness direction in the cases of displaying black, intermediate and white levels on the LC panel. The constraint of the orientation by the substrate surfaces allows the LC molecules to align more uniformly in one direction in the vicinity of black level compared to the vicinity of white level (or less black level), as shown in FIG. 9. In this respect, the color tint is larger when the display indicates more black level. However, the color is in fact more visible in the vicinity of the intermediate level because the color tint is not clearly observed in the black level.

To solve the problem color tint, JP-A-9-105908 proposes disposition of diagonal edges of the common electrode 103 and the pixel electrode 104, as shown in FIG. 10, thereby rotating the LC molecules in both the rotational directions. The proposed technique reduces the color tint remarkably; however, it involves reduction of the ratio of the opening area to the total area in each pixel area due to the diagonal edges. In addition, the interface between the areas of the opposite rotational directions generates a reverse-twist disclination, which involves afterimage observed by human eyes.

SUMMARY OF THE INVENTION

It is therefore an object of the present invention to provide an active matrix LCD device capable of decreasing the color tint as observed in a high viewing angle while maintaining a high opening ratio of the pixel area.

The present invention provides an active matrix LCD device comprising first and second panels and a liquid crystal (LC) layer including LC molecules sandwiched between the first panel and second panel. The first panel has a first transparent substrate mounting thereon a plurality of pixel elements arranged in a matrix, a plurality of scanning lines each disposed for a corresponding row of the pixel elements, a plurality of signal lines disposed for a corresponding column of the pixel elements, a common electrode having an electrode portion in each of the pixel elements, each of the pixel elements having a pixel electrode opposing the electrode portion in a direction parallel to the first panel and a switching transistor activated by a corresponding one of the scanning lines to couple the pixel electrode to a corresponding one of the signal lines, at least one interlevel insulation film for insulation, and an orientation film for orienting major axes of the LC molecules in a vicinity of the first panel.

Each of the pixel elements has a configuration such that an electric field acting between the pixel electrode and a corresponding electrode portion is in a direction between 0° and 45° with respect to a normal line of surfaces of the pixel electrode and the electrode portion at the surfaces, whereby the LC molecules are rotated in opposite rotational directions by the electric field.

In accordance with the active matrix LCD device of the present invention, since the LC molecules are rotated in both the rotational directions without provision of diagonal edges of the electrodes, human eyes can observe both the major axes and the minor axes of the LC molecules at the same time. Accordingly, the opening ratio of the pixel can be assured in the direction of a high viewing angle without involving an afterimage.

The configuration may be implemented by a plurality of diagonal slits formed in the insulator films in the first panel or by a plurality of protrusions formed on the edges of the electrodes.

The above and other objects, features and advantages of the present invention will be more apparent from the following description, referring to the accompanying drawings.

PREFERRED EMBODIMENTS OF THE INVENTION

Figure 1:
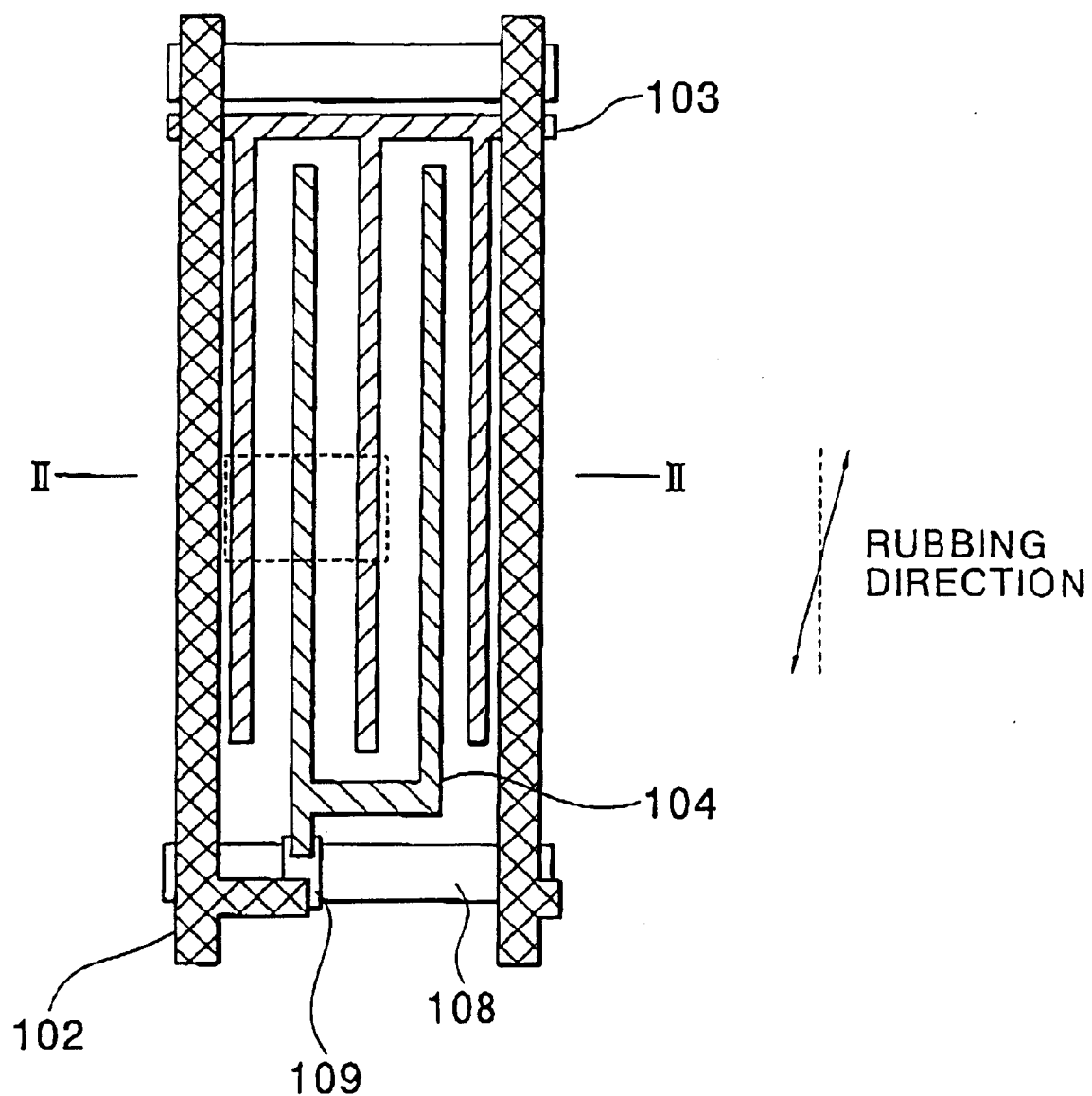
FIG. 1 is a top plan view of a unit pixel in a conventional active matrix LCD device.
Figure 2:
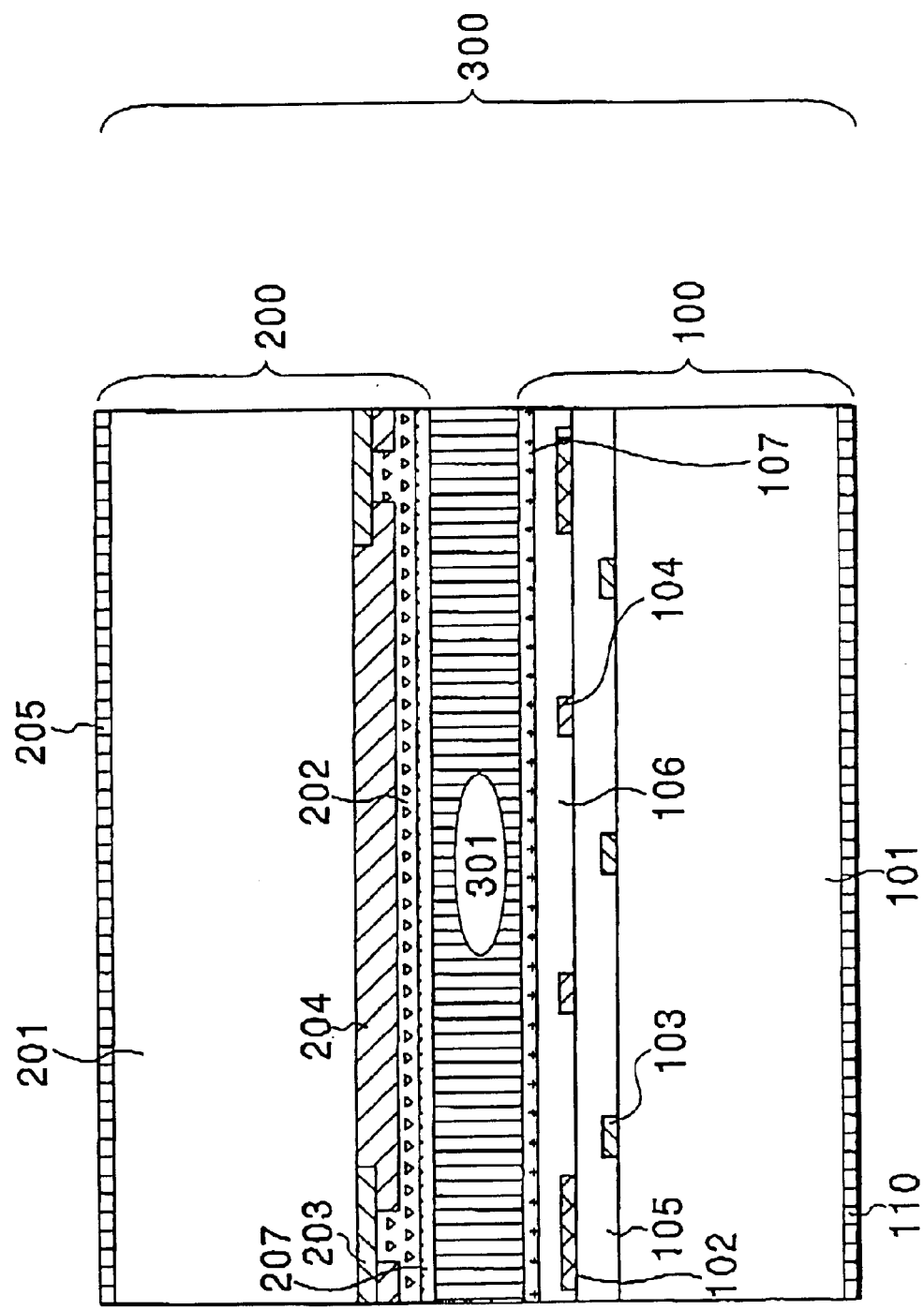
FIG. 2 is a sectional view along taken along II—II in FIG. 1.
Figure 3:
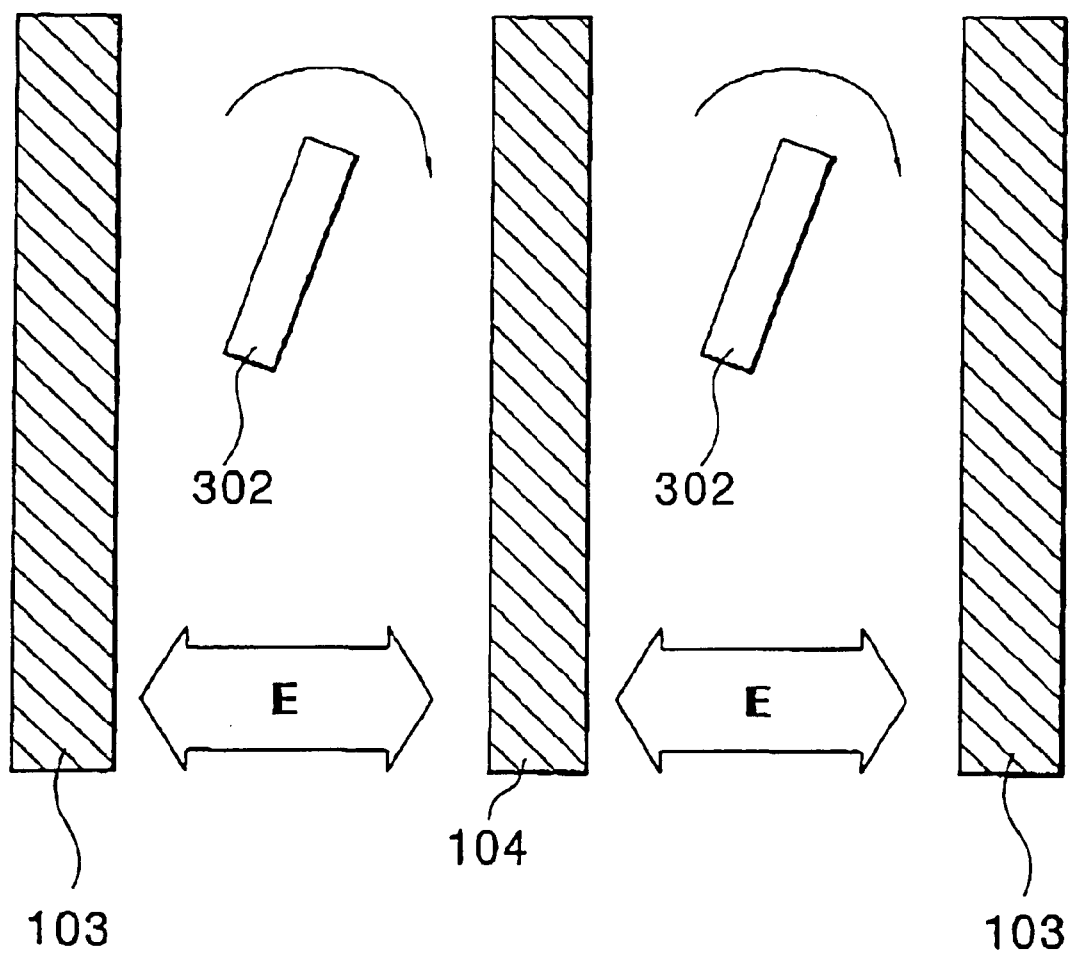
FIG. 3 is a schematic top plan view of the unit pixel of FIG. 1 for showing the principle of the active matrix LCD device.
Figure 4:
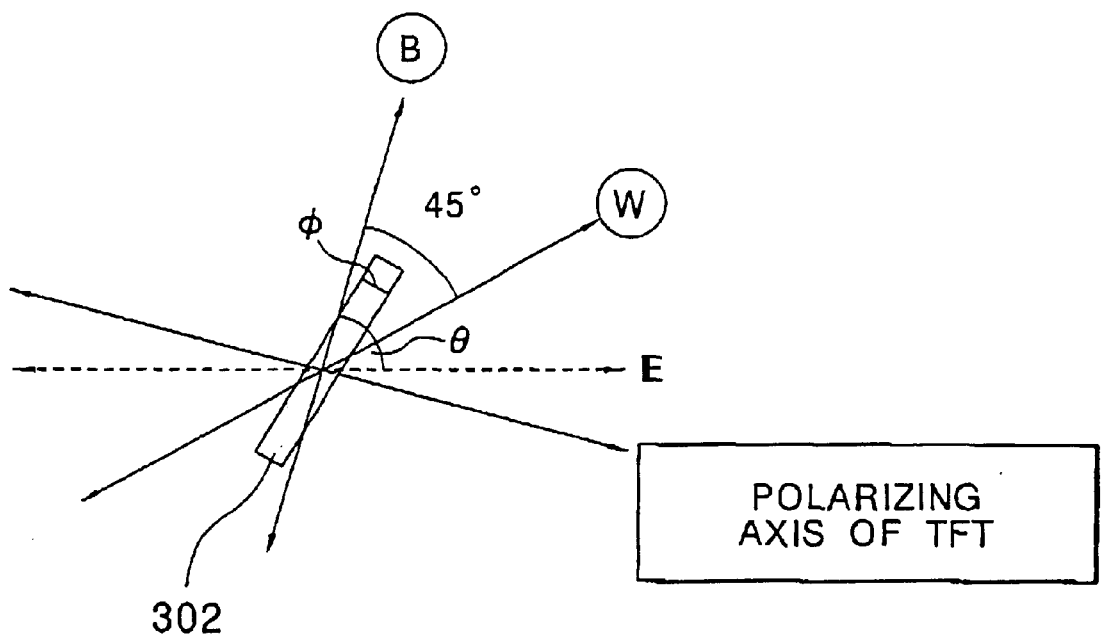
FIG. 4 is a schematic diagram of the LC molecule for showing operation of the LCD device.
Figure 5:
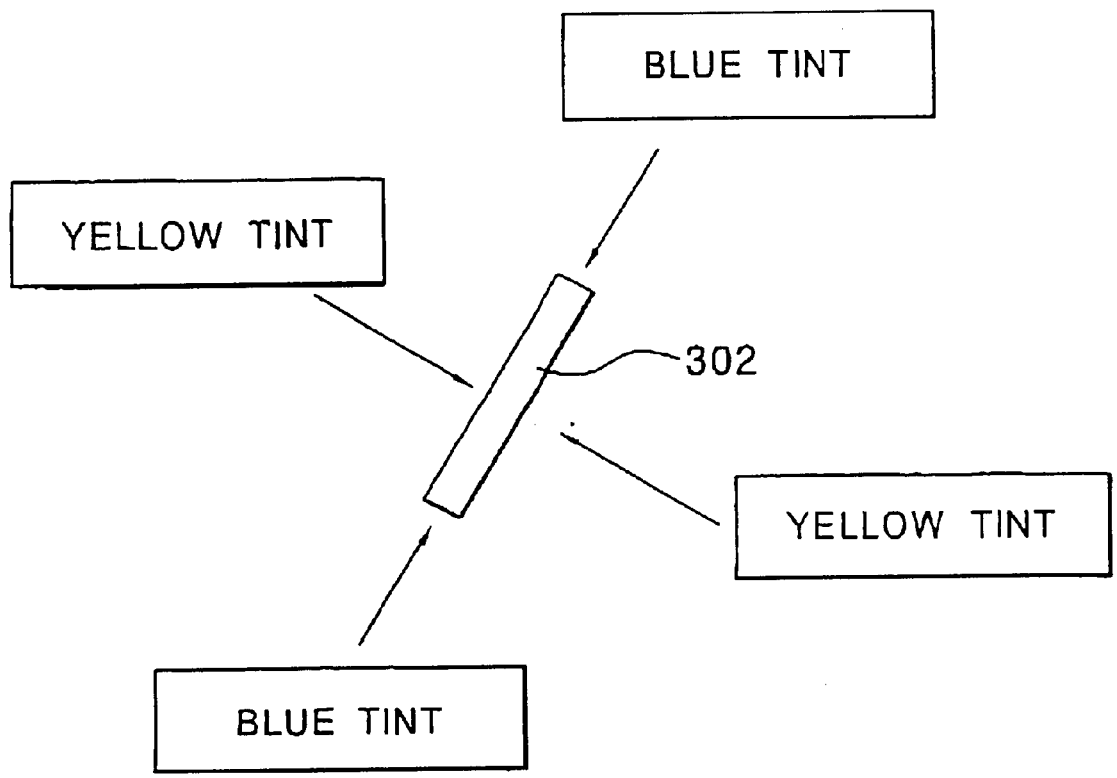
FIG. 5 is a schematic diagram of the LC molecule for showing the color tint.
Figure 6:
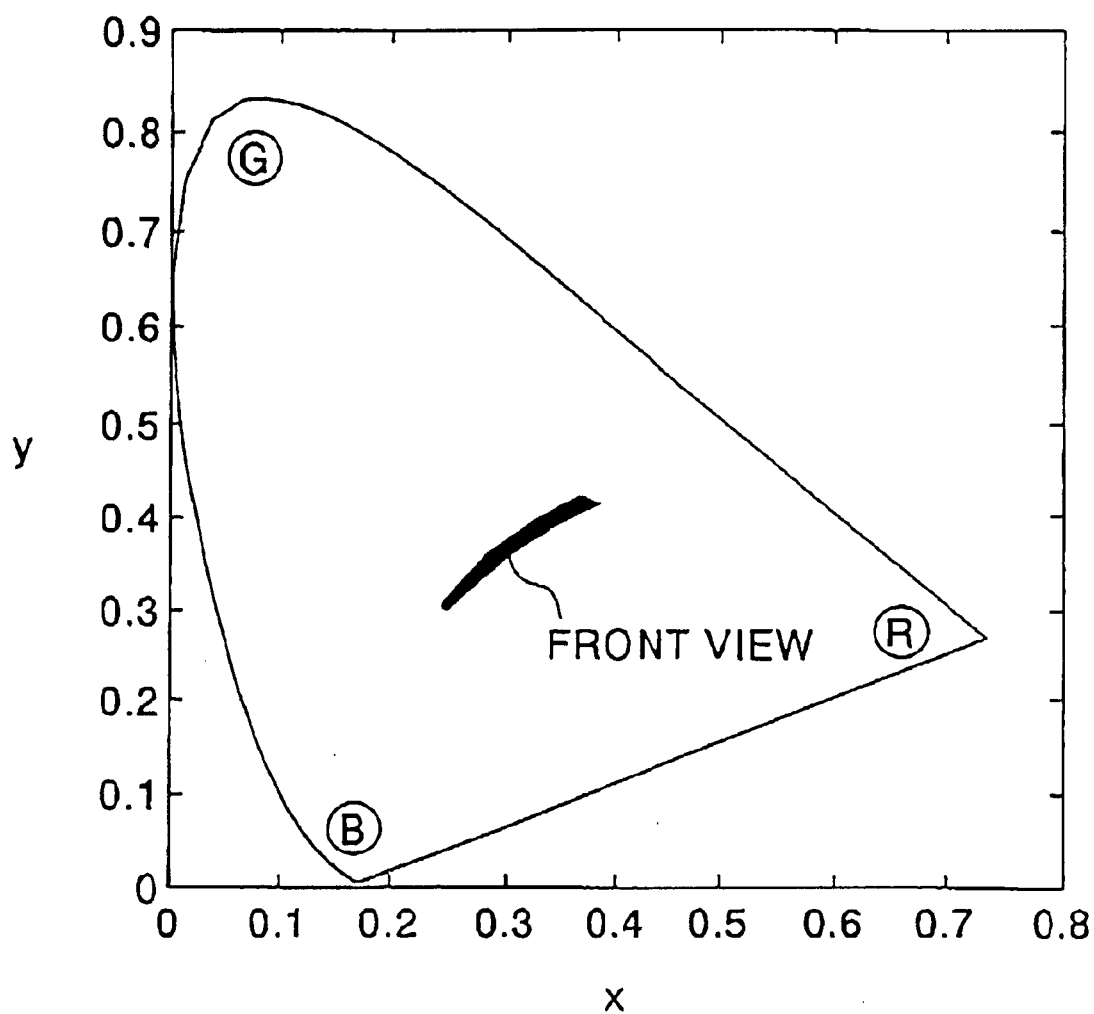
FIG. 6 is a x-y ordinate chromaticity diagram for showing the color tint in the LCD device of FIG. 1.

Now, the present invention is more specifically described with reference to accompanying drawings, wherein similar constituent elements are designated by similar reference numerals throughout the drawings.

Figure 11:
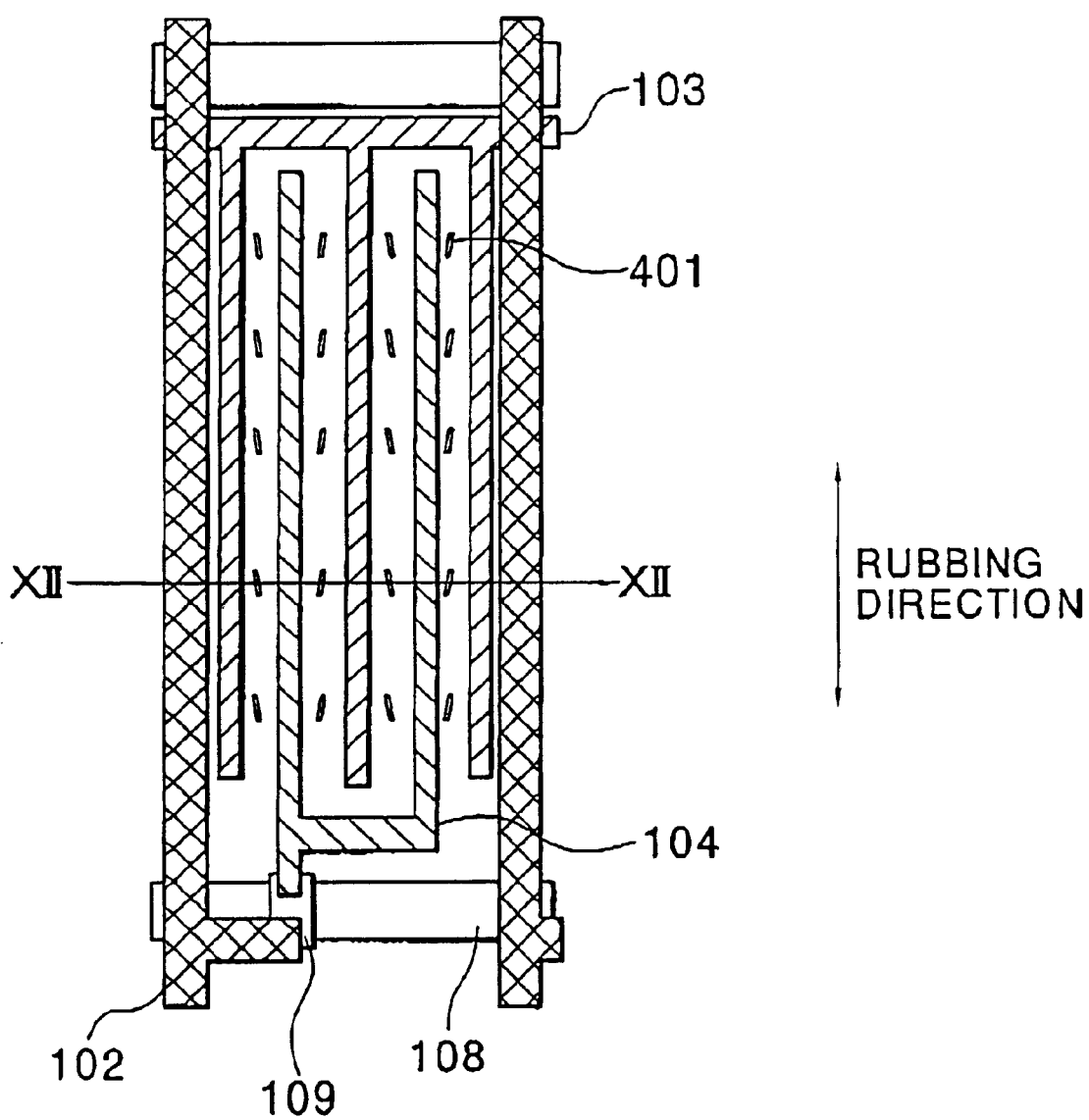
FIG. 11 is a top plan view of a unit pixel in an active matrix LCD according to a first embodiment of the present invention.

Referring to FIG. 11, an active matrix LCD device according to a first embodiment of the present invention includes a plurality of pixel elements arranged in a matrix, a plurality of scanning lines 108 each connected to external drive circuit and gates of a corresponding row of the pixel elements, a plurality of signal lines 102 each for supplying a corresponding column of the pixel elements, a common electrode 103 disposed for all of the pixel elements and having a comb-shape electrode portion in each pixel area. Each pixel element includes a thin film transistor (TFT) 109 and a pixel electrode 104 having a comb shape corresponding to the comb shape of the common electrode 103.

Figure 12:
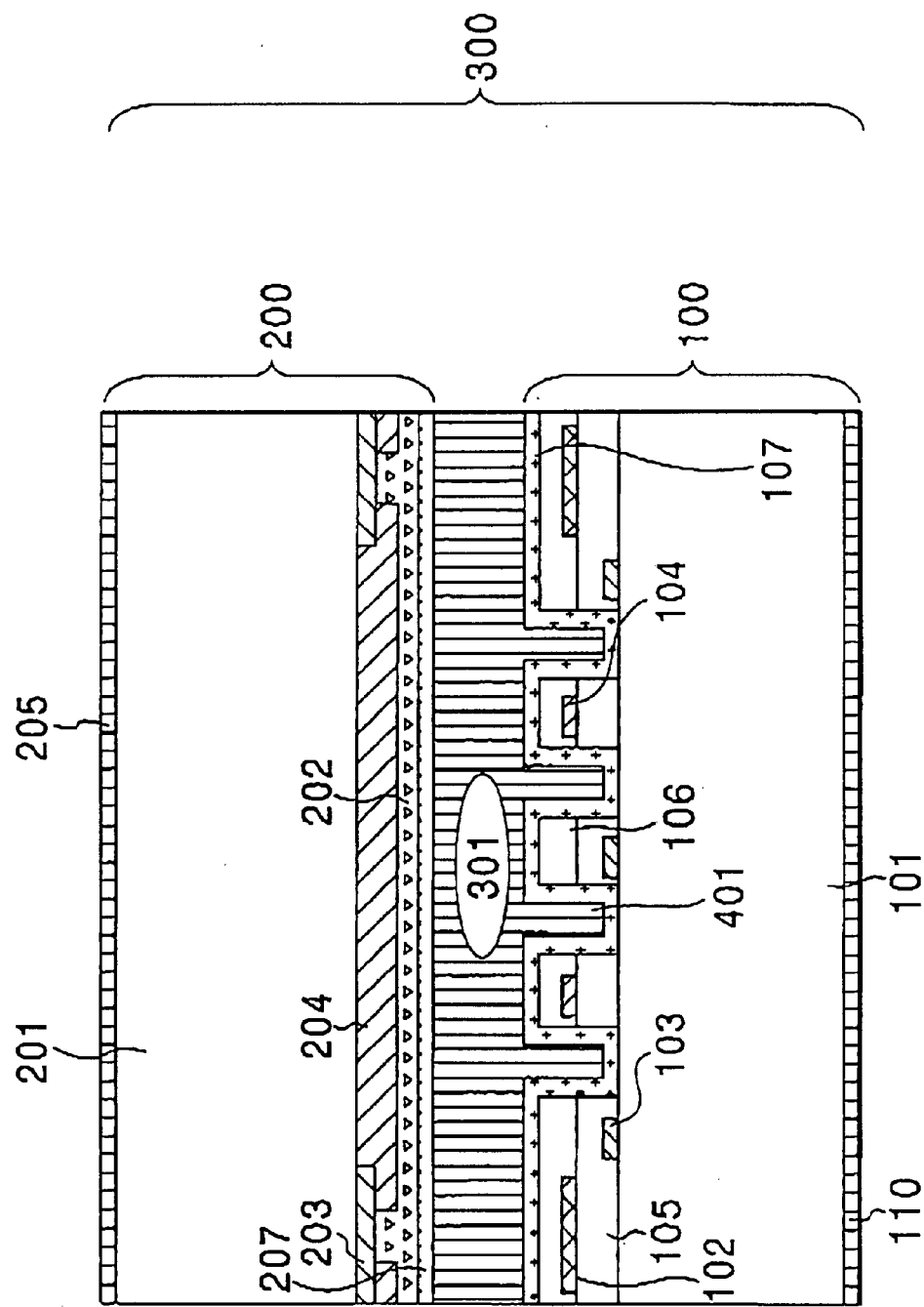
FIG. 12 is a sectional view taken along line XII—XII in FIG. 11.

Referring to FIG. 12 taken along line XII—XII in FIG. 11, the LCD panel 300 of the LCD device includes a TFT panel 100 and a counter panel 200. The TFT panel 100 includes, from the front side thereof, a TFT glass substrate 101 having a first polarizing plate 110 on the front side thereof, the common electrode 103, an insulator film 105, and the pixel electrode 104 and the signal line 102. The teeth of the comb-shape pixel electrode 104 and teeth of the comb-shape common electrode 103 are arranged alternately with each other as viewed in the direction normal to the LCD panel 300. These, electrodes 104 and 103 are protected by a protective insulator layer 106, on which a first orientation film 107 is formed by coating. The first orientation film 107 is subjected to a rubbing step in a first direction.

The protective insulator film 106 and the interlayer insulator film 105 have therein a plurality of diagonal slits 401 between each tooth of the pixel electrode 104 and a corresponding tooth of the common electrode 103. The diagonal slits 401 are inclined from the longitudinal direction of these electrode teeth, as shown in FIG. 11. The rubbing direction of the orientation film 107 is parallel to the electrode teeth.

The counter panel 200 has, from the rear side thereof, a glass counter substrate 201 having a second polarizing plate 205 on the rear side thereof, a matrix shield film 203 for shielding light, a color film 204 for displaying multi-color image, a planarization film 202, and a second orientation film 207. The second orientation films 207 is subjected to rubbing in the second direction opposite to the first direction.

LC layer 301 including LC molecules is sandwiched between the TFT panel 100 and the counter panel 200, and the LC molecules are oriented in the first direction adjacent to the TFT panel 100 by the first orientation film 107 and in the second direction adjacent to the counter panel 200 by the second orientation film 107. The liquid crystal 301 is introduced into the diagonal slits 401 of the TFT panel 100 in the insulator films 105 and 106.

The first polarizing plate 110 bonded onto the front side of the TFT substrate 101 has a light transmission axis perpendicular to the first direction, whereas the second polarizing plate 205 bonded onto the rear side of the counter substrate 201 has a light transmission axis perpendicular to the light transmission axis of the first polarizing plate 110.

Figure 13:
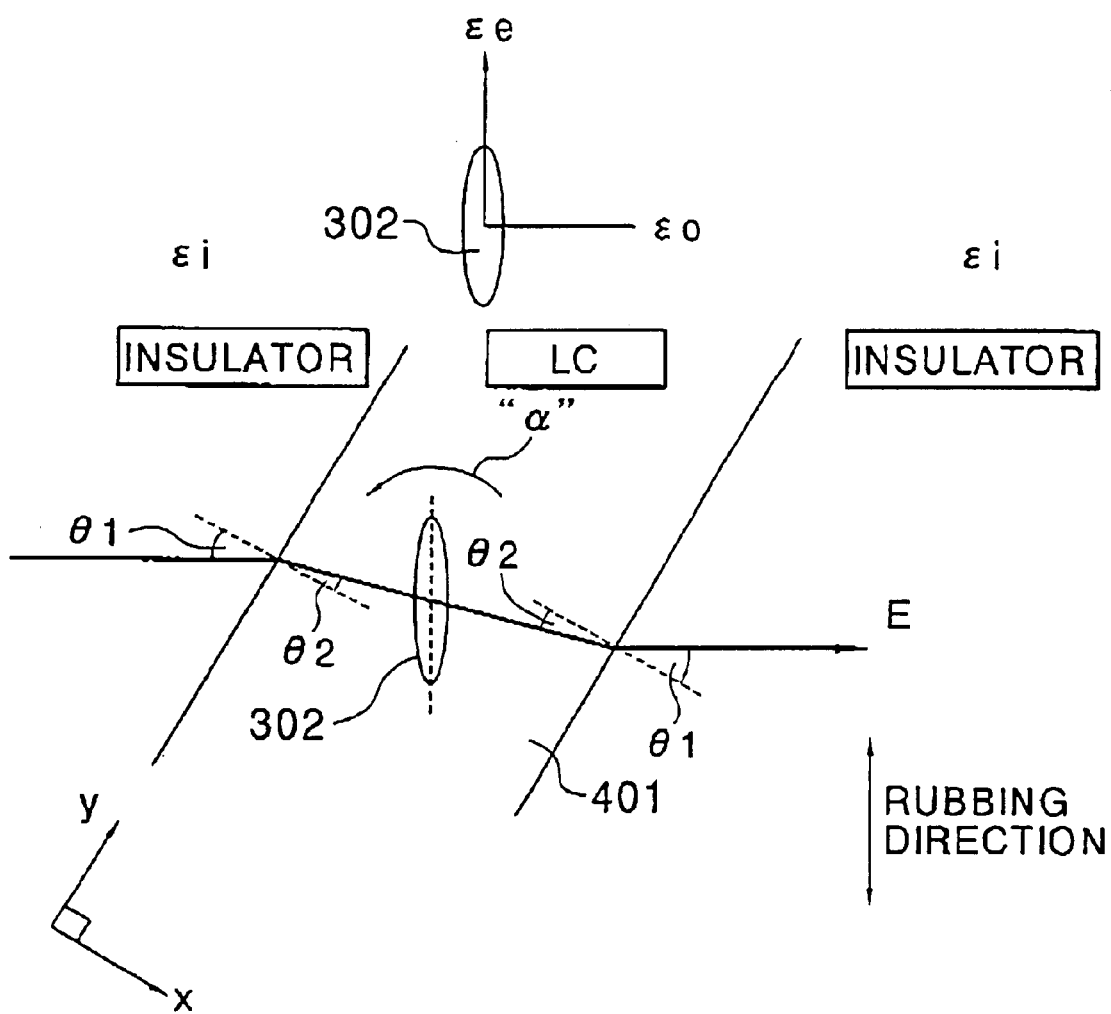
FIG. 13 is a schematic diagram showing operation of the active matrix LCD device of FIG. 11.

Referring to FIG. 13 showing the principle of the operation of the active matrix LCD device of FIG. 11, the liquid crystal exemplarily has a positive dielectric anisotropy. The electric field E generated between the common electrode 103 and the pixel electrode 104 changes its direction on the interfaces between the liquid crystal 301 and the insulator films 105 and 106, formed at the edge of the diagonal slit 401 in the insulator films 105 and 106. The change of the direction of the electric field is based on the Maxwell equation to satisfy the following equations (3) and (4):

$$D_{1x}=D_{2x} \quad (3)$$

$$E_{1y}=E_{2x} \quad (4)$$

wherein $D_{1x}$, $D_{2x}$, $E_{1y}$ and $E_{2y}$ are x-component of the electric displacement D in the insulator films, x-component of the electric displacement D in the liquid crystal, y-component of the electric field E in the insulator films and y-component of the electric field E in the liquid crystal, respectively.

Thus, the electric field E generated between the electrode teeth changes its direction on the interface toward the normal line of the interface as the electric field enters from the insulator films into the diagonal slit 401. As a result, the LC molecules 302 in the diagonal slit 401 rotate in a counter-clockwise direction, as shown by arrow "α" due to the electric field. Other LC molecules aligned with the rotating LC molecules also rotate in the same direction, with the starting points of the rotation being the poles of the LC molecules disposed in the diagonal slit 401, based on the nature of the nematic liquid crystal.

Figure 14A:
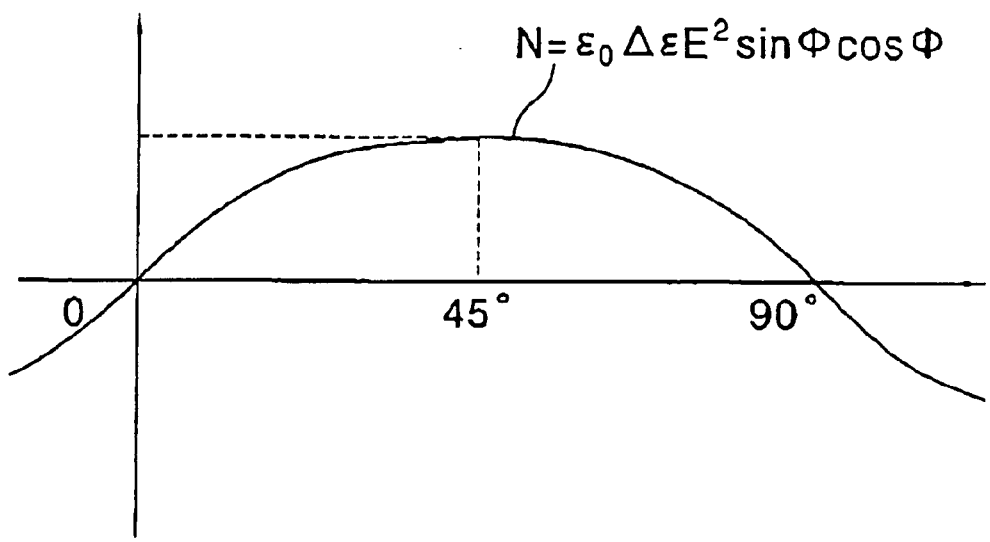
FIG. 14A is a graph showing viewing angle dependency of torque acting of the LC molecules.

The diagonal slits 401 generate different directions of the electric files in the spaces between the electrode teeth, thereby allowing the LC molecules 301 in the diagonal slits 401 to rotate different directions (or opposite directions). The inclined angles of the diagonal slits 401 provide different torque N for the LC molecules 301, as shown in the graph of FIG. 14A, wherein the torque N is expressed by:

$$N = \epsilon_0 \Delta E^2 \times \sin\phi \cos\phi.$$

Figure 14B:
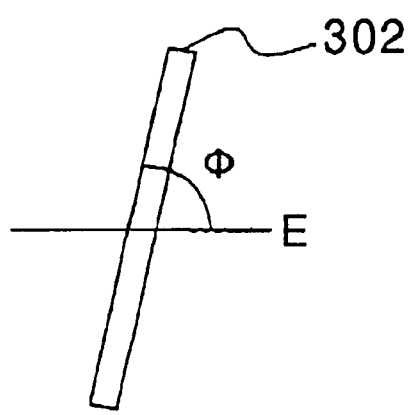
FIG. 14B is a schematic diagram showing the angle between major axis of the LC molecule and an electric field.

The angle $\phi$ is defined between the major axis of the LC molecule and the electric field E as shown in FIG. 14B.

Figure 15:
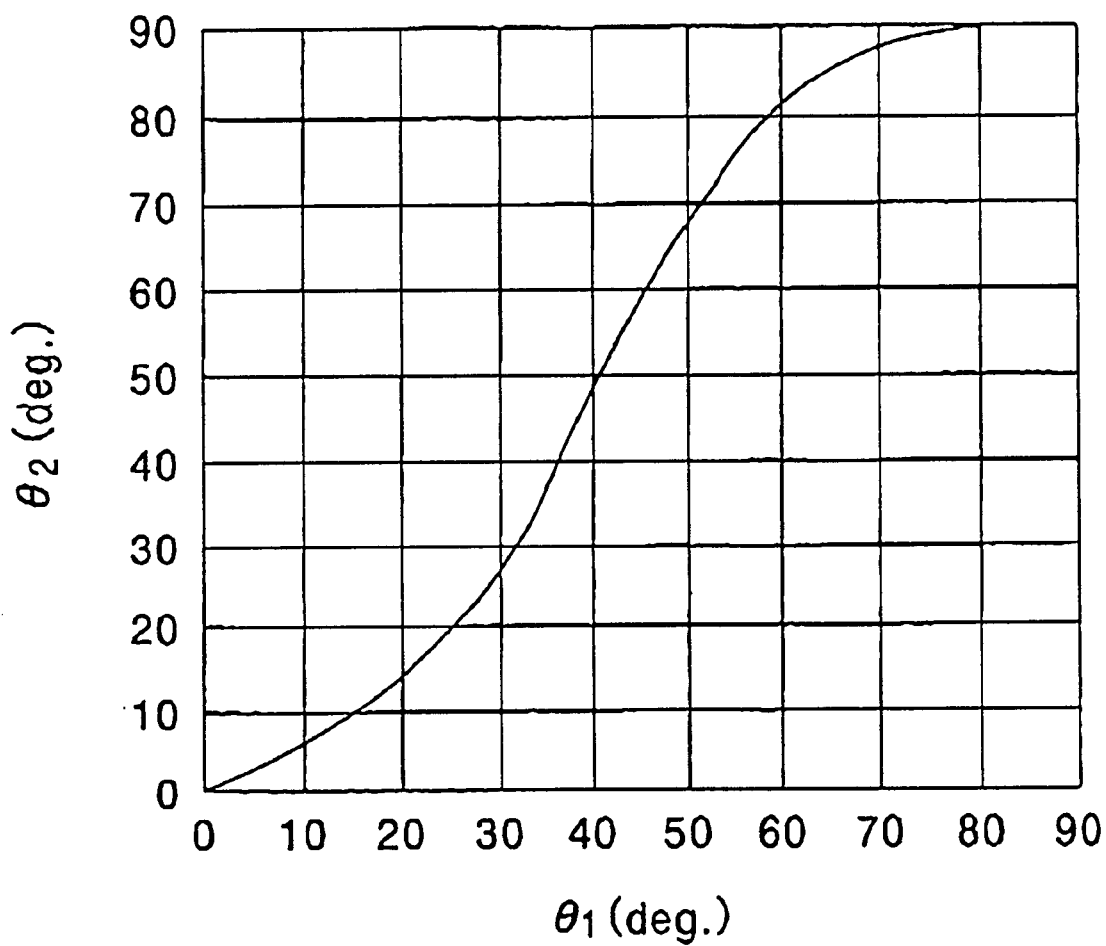
FIG. 15 is a graph showing the direction of electric field calculated for the active matrix LCD device of FIG. 11.

The angles $\phi_1$ and $\phi_2$ in the insulator films and in the liquid crystal, respectively, between the electric field E and the normal line of the interface are expressed by equation (5) after applying the boundary conditions defined by equations (3) and (4) at the interface of the diagonal slit 401 to the single-axis LC molecules having a dielectric anisotropy.

$$\epsilon_i \tan\theta_2/\tan\theta_1 = (\epsilon_e \sin^2\theta_1 + \epsilon_0 \cos^2\theta_1) + (\epsilon_e - \epsilon_0)\sin\theta_1 \cos\theta_1 \tan\theta_1 \quad (5)$$

wherein $\epsilon_c$, $\epsilon_0$, $\epsilon_i$ are dielectric constants of major axis of LC molecule, minor axis of LC molecule and insulator films. FIG. 15 shows the relationship between angles $\theta_1$ and $\theta_2$, wherein $\theta_1 > \theta_2$ in the lower angle range and $\theta_1 < \theta_2$ in the higher angle range.

Figure 16:
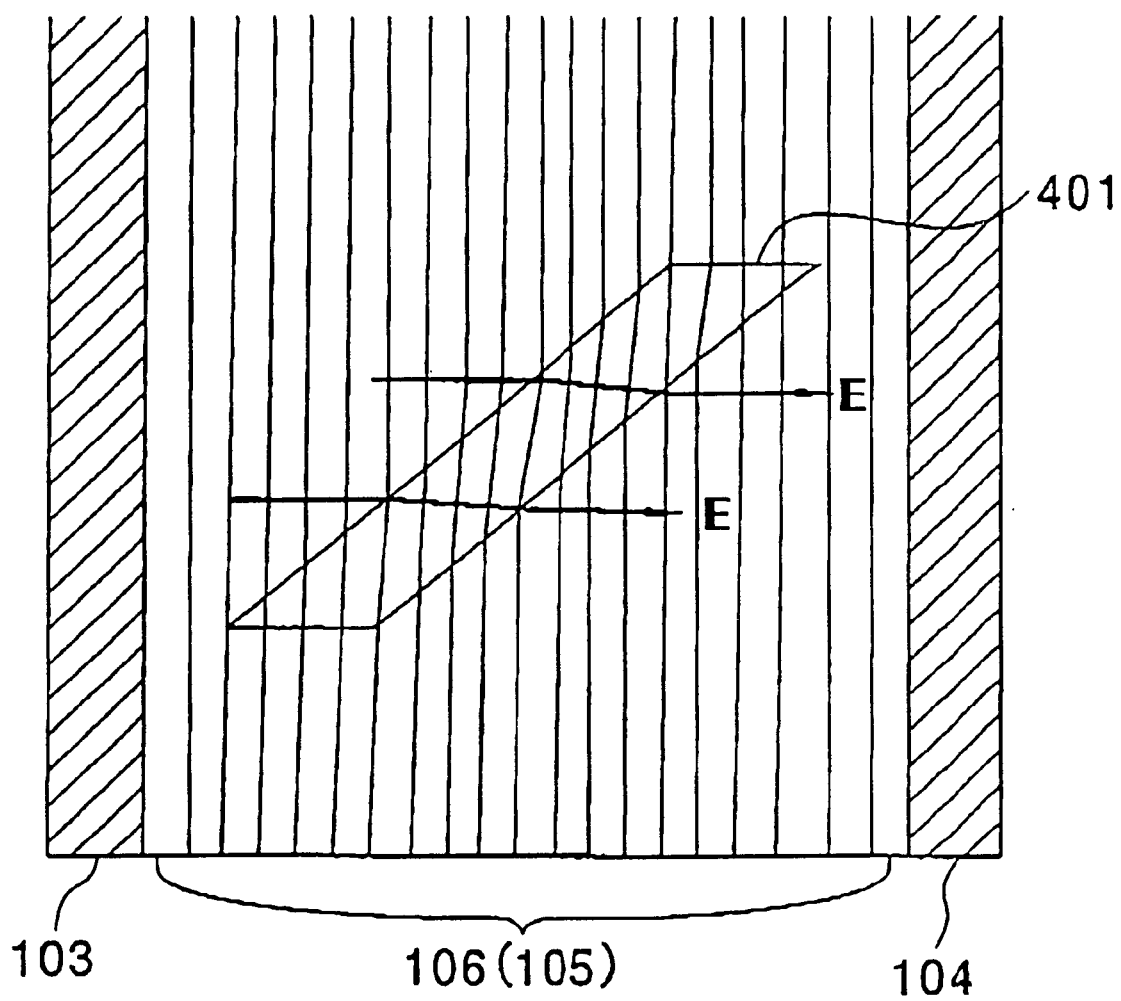
FIG. 16 is a schematic diagram showing results of simulation for the active matrix LCD device of FIG. 11.

FIG. 16 shows results of simulation for the equipotential distribution based on the diagonal slit. Table 2 shows the physical properties of the materials used for the simulation.

TABLE 2

| | |
|---|---|
| Dielectric constant $\epsilon_c$ of major axis of the LC molecule | 9.0 |
| Dielectric constant $\epsilon_o$ of minor axis of the LC molecule | 3.0 |
| Dielectric constant $\epsilon_i$ of the insulator films | 6.4 |

Figure 7:
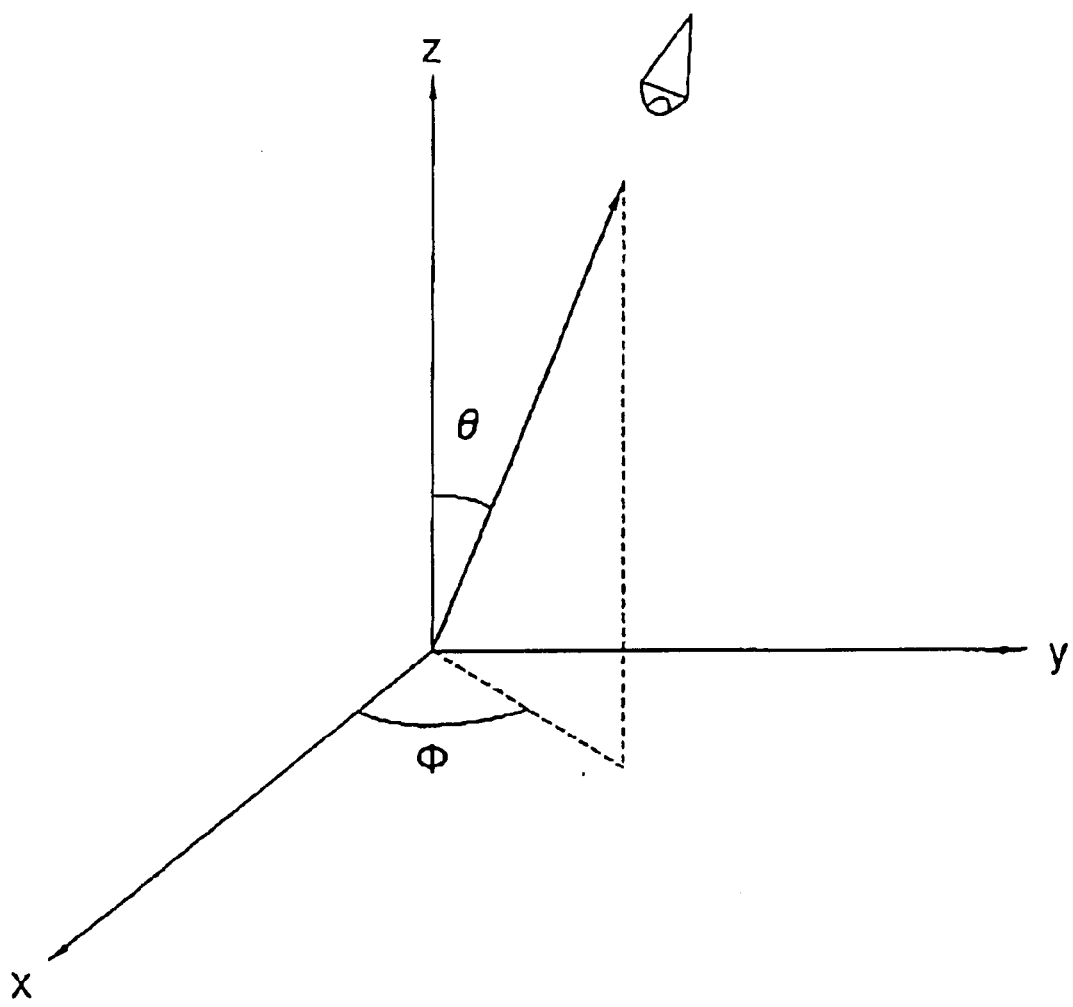
FIG. 7 is a diagram for defining the viewing angle and azimuth of a general LCD device.
Figure 8:
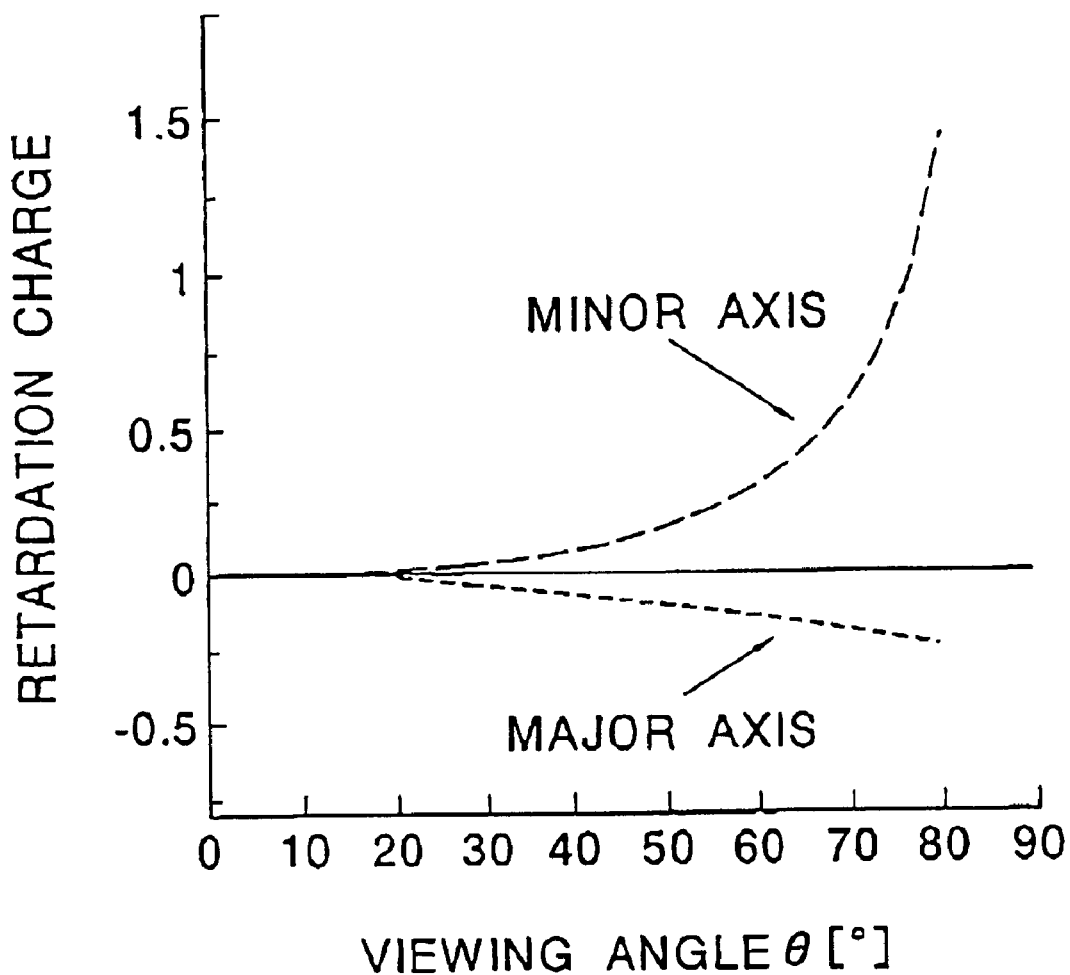
FIG. 8 is a graph for showing viewing angle dependency of the effective retardation of the LCD device of FIG. 1.
Figure 9:
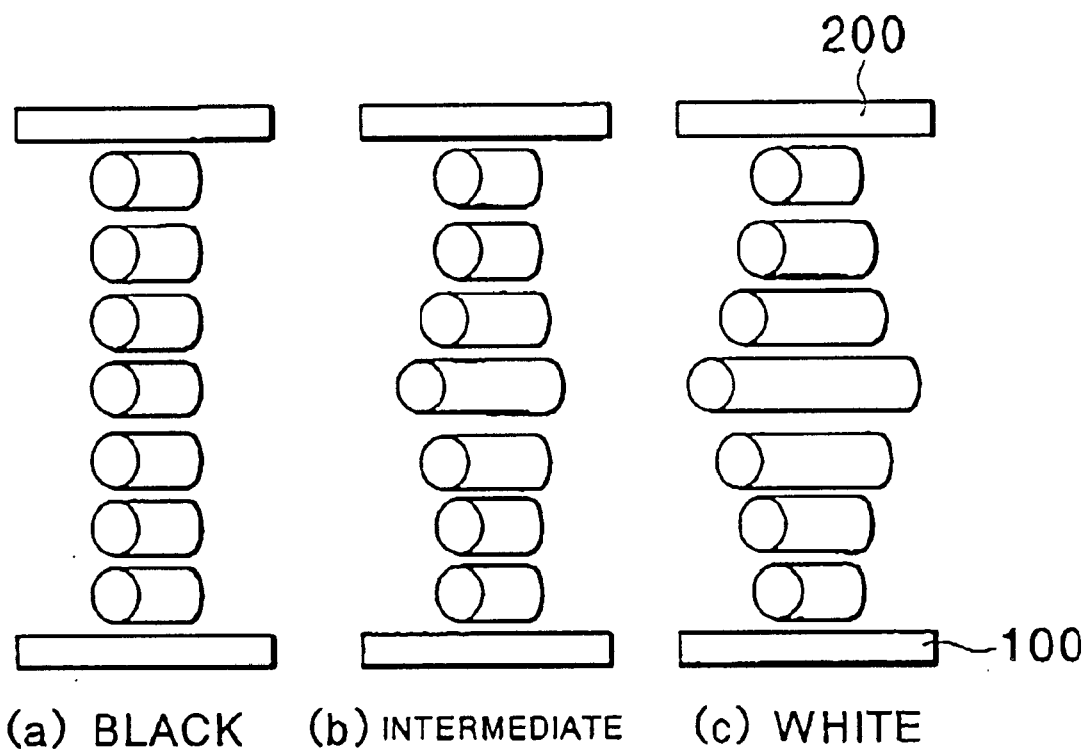
FIG. 9 is a schematic diagram for showing orientation of the LC molecules in the case of black, intermediate and white levels.
Figure 10:
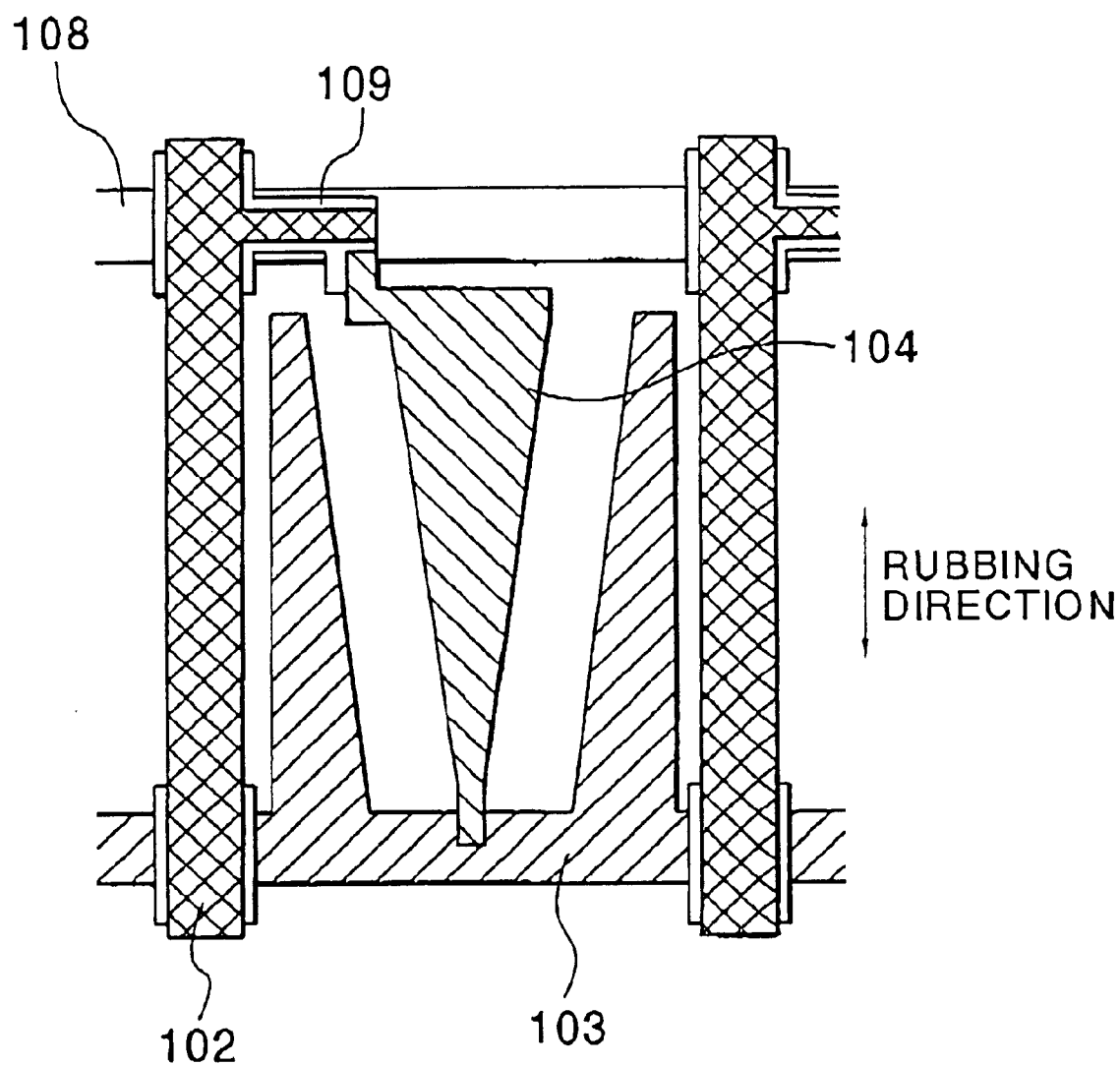
FIG. 10 is a schematic top plan view of a unit pixel in another conventional LCD device proposed in a publication.
Figure 17:
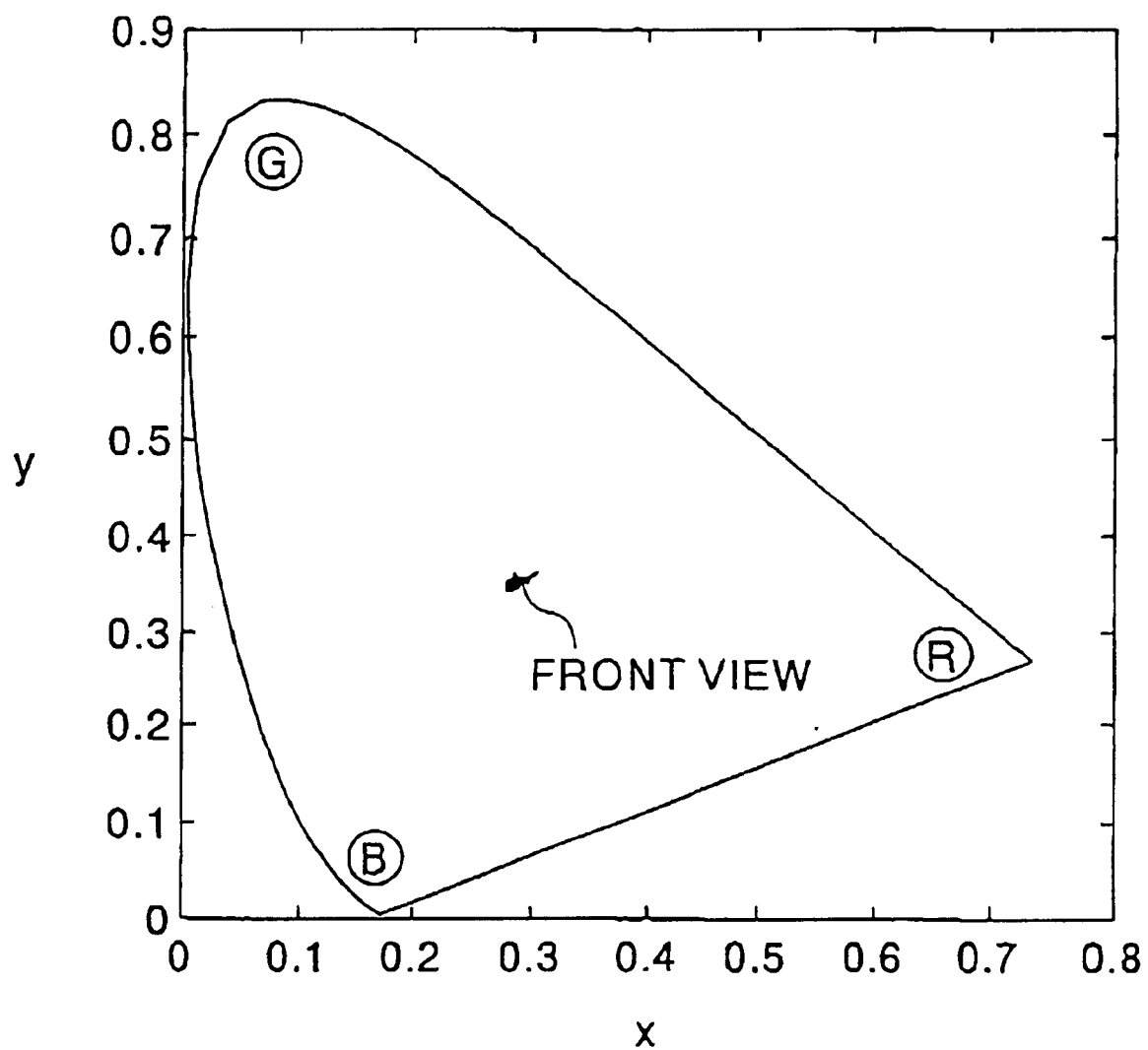
FIG. 17 is x-y coordinate chromaticity for the active matrix LCD device of FIG. 11.

The active matrix LCD device according to the first embodiment was fabricated and subjected to operational tests, wherein an intermediate level is displayed on the LCD device. The intermediate level is observed with a viewing angle of 60° and azimuth of 0 to 360°, the viewing angle and azimuth being defined in FIG. 7. The resultant chromaticity change is shown in FIG. 17, wherein the chromaticity change was reduced to ⅙ compared to the conventional active matrix LCD device. In a physical or bodily sense, substantially no color tint was observed from any viewing angle and azimuth by human eyes.

Figure 18:
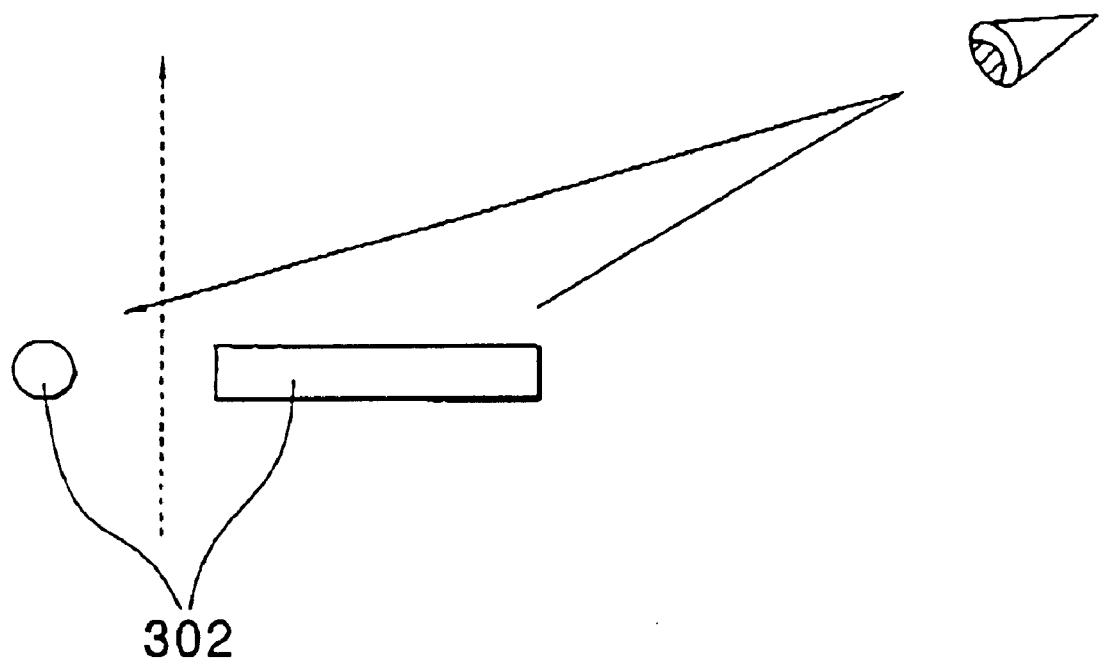
FIG. 18 is a schematic diagram showing the reduction of color tint in the active matrix LCD device of FIG. 11.

The improvement as obtained above originate from the different rotational directions of the LC molecules in the pixel area. Specifically, as shown in FIG. 18, the human eye observes in the directions of the major axes and minor axes of the LC molecules at the same time. In this situation, the boundary between the area for the major axes and the area for the minor axes does not pass the light therethrough because the LC molecules disposed at the boundary cannot rotate. However, since the boundary resides on the electrode teeth, as will be understood from FIG. 11, the boundary does not degrade the transmittance of the LC panel. In addition, the absence of the electric field in the opening area of the pixel provides reduction of afterimage and uniformity of the image.

In the first embodiment, the active matrix LCD device includes LC molecules having a positive dielectric anisotropy. If the LC molecules have a negative dielectric anisotropy, similar results can be obtained in a reflective LCD device.

Figure 19:
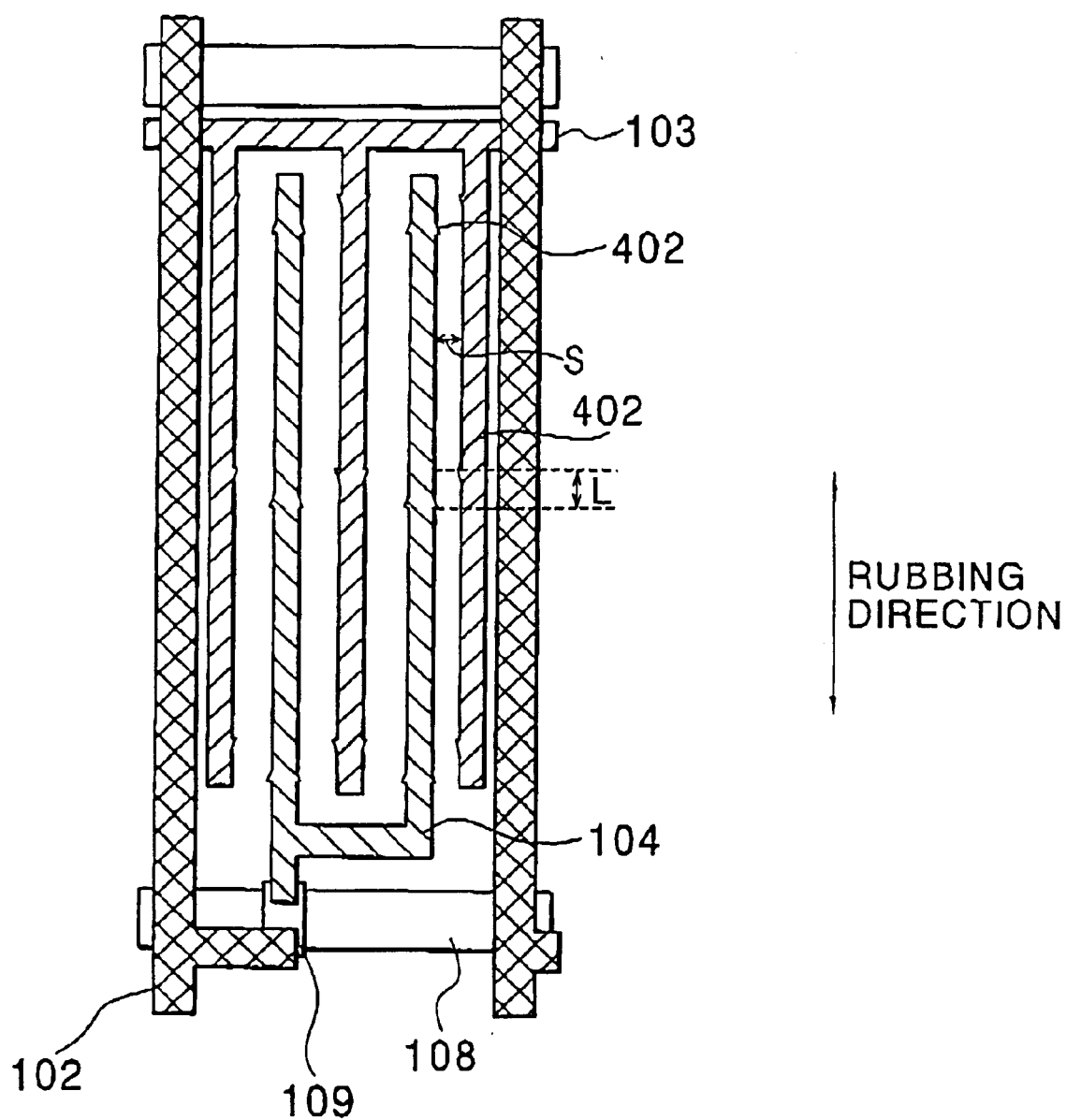
FIG. 19 is a top plan view of a unit pixel in an active matrix LCD according to a second embodiment of the present invention.

Referring to FIG. 19, the active matrix LCD device according to a second embodiment of the present invention is similar to the first embodiment except that the shape of the electrode teeth is modified in the present invention instead of provision of the diagonal slits. Specifically, the teeth of the comb-shape common electrode 103 and pixel electrode 104 have protrusions 402 on the edge thereof.

Figure 20:
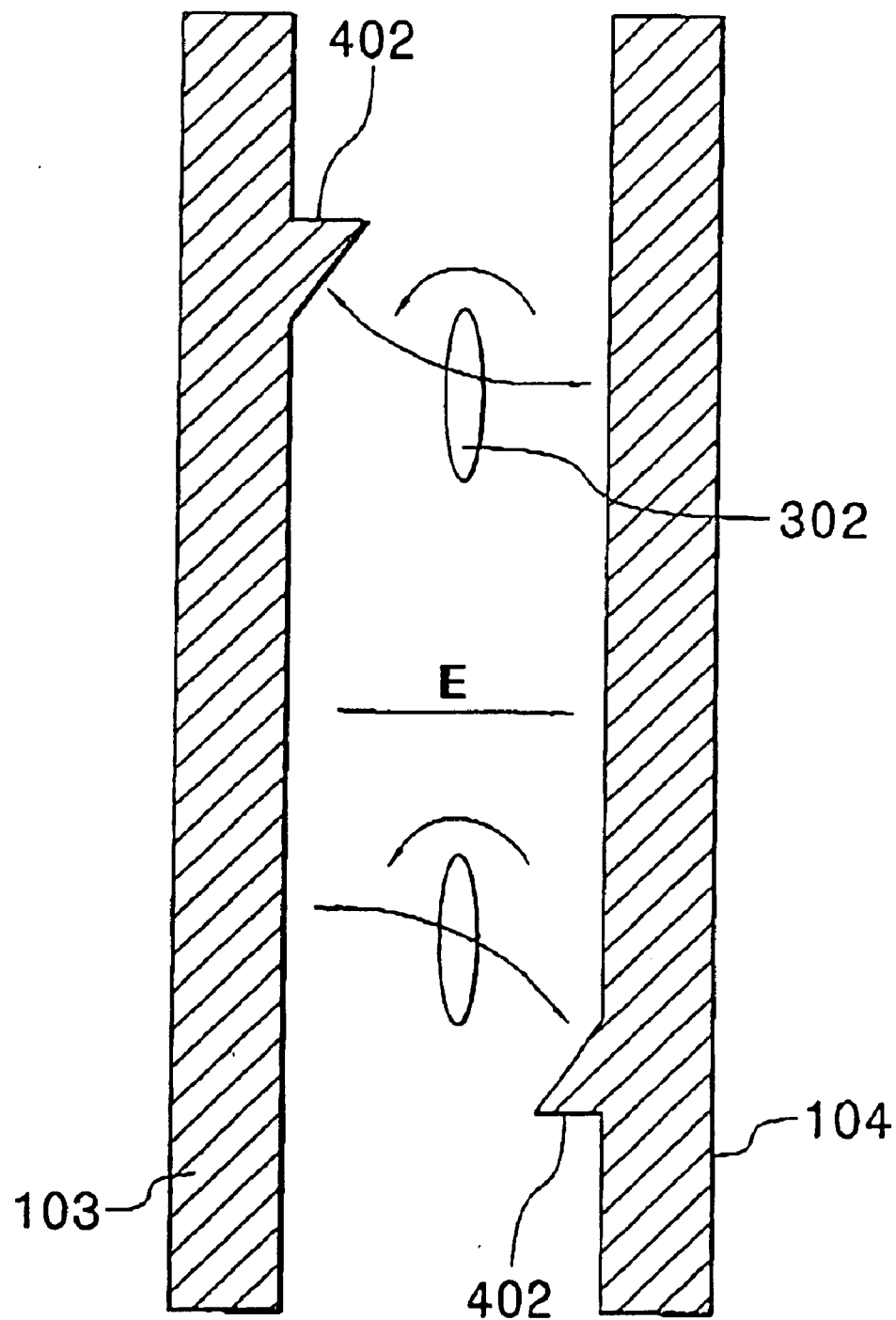
FIG. 20 is a schematic diagram showing operation of the active matrix LCD device of FIG. 19.
Figure 21:
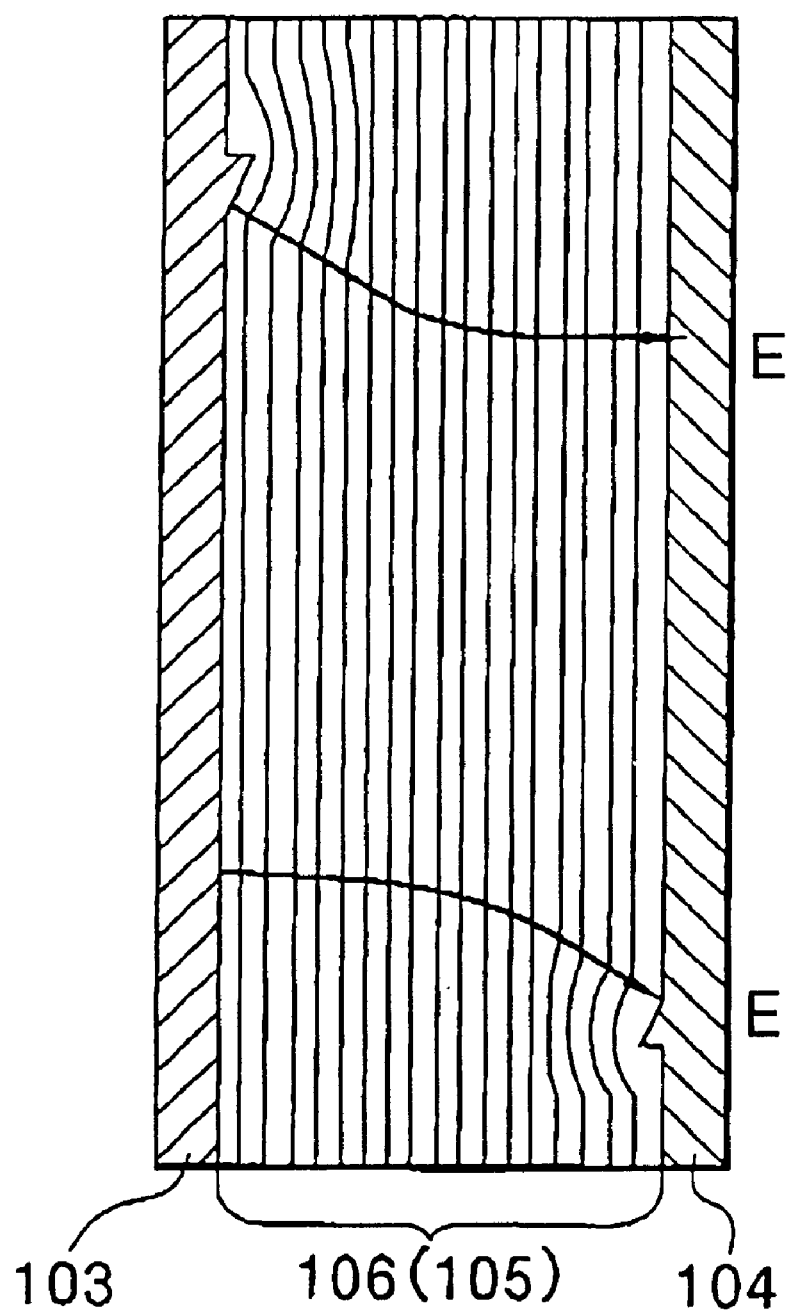
FIG. 21 is a schematic diagram showing results of simulation for the active matrix LCD device of FIG. 19.

Referring to FIG. 20, each protrusion 402 is formed to define a surface diagonal to the extending direction of the teeth. The diagonal surface defines the direction of the electric field E at the surface of the electrode teeth, and thus defines the initial orientation of the LC molecules 302 in the vicinity of the TFT panel. The distance "L" between the protrusions 402 having opposing diagonal surfaces, as measured in the direction of the electrode teeth, is smaller than the distance "S" between the opposing edges of the electrode teeth. FIG. 21 shows results of simulation for equipotential distribution, wherein electric lines of force starts normal to the electrode teeth and ends diagonal to the electrode teeth, or starts diagonal to the electrode teeth and ends normal to the electrode teeth. The conditions for obtaining both the rotational directions of the LC molecules is L<S, as described above.

According to the present embodiment, human eyes observe in the direction along major axes and minor axes of the LC molecules 302, as a result of which change in white chromaticity is small. In addition, the boundary between both the areas for the different rotational directions resides on the electrode teeth, thereby preventing reduction in the light transmission, substantially eliminating after image and maintaining image uniformity. The present embodiment can be also applied to a reflective LCD device having a negative dielectric anisotropy.

Since the above embodiments are described only for examples, the present invention is not limited to the above embodiments and various modifications or alterations can be easily made therefrom by those skilled in the art without departing from the scope of the present invention.

What is claimed is:

1. An active matrix liquid crystal display (LCD) device comprising first and second panels and a liquid crystal (LC) layer including LC molecules sandwiched between said first panel and second panel, said first panel having a first transparent substrate mounting thereon a plurality of pixel elements arranged in a matrix, a plurality of scanning lines each disposed for a corresponding row of said pixel elements, a plurality of signal lines disposed for a corresponding column of said pixel elements, a common electrode having an electrode portion in each of said pixel elements, each of said pixel elements having a pixel electrode opposing to said electrode portion in a direction parallel to said first panel and a switching transistor activated by a corresponding one of said scanning lines to couple said pixel electrode to a corresponding one of said signal lines, at least one interlevel insulation film for insulation, and an orientation film for orienting major axes of said LC molecules in a vicinity of said first panel, wherein said common and pixel electrodes are formed in parallel with said signal lines, and each of said pixel elements has a configuration such that an electric field acting between said pixel electrode and said corresponding electrode portion is in a direction that deviates from a line normal to a surface of said pixel electrode and from a line normal to a surface of said electrode portion by an angle greater than 0° and by as much as 90°/at said surfaces, whereby said LC molecules are rotated in opposite rotational directions by said electric field.

2. The active matrix LCD device as defined in claim 1, wherein said configuration includes a diagonal slit formed on a surface of said first panel between said pixel electrode and said electrode portion, said diagonal slit defines a pair of interfaces between said surface of said first panel and a surface of said LC layer, said interface being diagonal to said surfaces of said pixel electrode and said electrode portion.

3. The active matrix LCD device as defined in claim 1, wherein said configuration includes a protrusion formed on said surfaces of said pixel electrode and said electrode portion.

4. An active matrix liquid crystal display (LCD) device comprising first and second panels and a liquid crystal (LC) layer including LC molecules sandwiched between said first panel and second panel, said first panel having a first transparent substrate mounting thereon a plurality of pixel elements arranged in a matrix, a plurality of scanning lines each disposed for a corresponding row of said pixel elements, a plurality of signal lines disposed for a corresponding column of said pixel elements, a common electrode having an electrode portion in each of said pixel elements, each of said pixel elements having a pixel electrode opposing to said electrode portion in a direction parallel to said first panel and a switching transistor activated by a corresponding one of said scanning lines to couple said pixel electrode to a corresponding one of said signal lines, at least one interlevel insulation film for insulation, and an orientation film for orienting major axes of said LC molecules in a vicinity of said first panel, wherein each of said pixel elements has a configuration electrode portion is in a direction between 0° and 45° with respect to a line normal to surfaces of said pixel electrode and said electrode portion at said surfaces, whereby said LC molecules are rotated in opposite rotational directions by said electric field, wherein said configuration includes a diagonal slit formed on a surface of said first panel between said pixel electrode and said electrode portion, said diagonal slit defines a pair of interfaces between said surfaces of said pixel electrode and said electrode portion, and wherein the following relationship holds:

$$\epsilon_i \tan\theta_2 / \tan\theta_1 = (\epsilon_e \sin^2\theta_1 + \epsilon_0 \cos^2\theta) + (\epsilon_e - \epsilon_0)\sin\theta_1 \cos\theta_1 \tan\theta_2,$$

where $\theta_1$, $\theta_2$, $\epsilon_e$, $\epsilon_0$, $\epsilon_i$ represent a first angle of said electric field in said insulator film with respect to said interface, a second angle of said electric field in said LC layer with respect to said interface, a first dielectric constant of major axes of said LC molecules, a second dielectric constant of minor axes of said LC molecules and a third dielectric constant of said insulator film, respectively, where $$\epsilon_0 < \epsilon_i < \epsilon_e.$$

5. An active matrix liquid crystal display (LCD) device comprising first and second panels and a liquid crystal (LC) layer including LC molecules sandwiched between said first panel and second panel, said first panel having a first transparent substrate mounting thereon a plurality of pixel elements arranged in a matrix, a plurality of scanning lines each disposed for a corresponding row of said pixel elements, a plurality of signal lines disposed for a corresponding column of said pixel elements, a common electrode having an electrode portion in each of said pixel elements, each of said pixel elements having a pixel electrode opposing to said electrode portion in a direction parallel to said first panel and a switching transistor activated by a corresponding one of said scanning lines to couple said pixel electrode to a corresponding one of said signal lines, at least one interlevel insulation film for insulation, and an orientation film for orienting major axes of said LC molecules in a vicinity of said first panel, wherein each of said pixel elements has a configuration such that an electric field acting between said pixel electrode and said corresponding electrode portion is in a direction between 0° and 45° with respect to a line normal to surfaces of said pixel electrode and said electrode portion at said surfaces, whereby said LC molecules are rotated in opposite rotational directions by said electric field, wherein said configuration includes a protrusion formed on said surfaces of said pixel electrode and said electrode portion, and wherein the following relationship holds:

$$L < S$$

where L and S represent a first distance between adjacent pairs of protrusions formed on said pixel electrode and said electrode portion, and a second distance between said pixel electrode and said electrode portion.

* * * * *